US012412368B2

(12) United States Patent
Coskun et al.

(10) Patent No.: US 12,412,368 B2
(45) Date of Patent: Sep. 9, 2025

(54) CLUSTERING VIDEOS USING A SELF-SUPERVISED DNN

(71) Applicant: Snap Inc., Santa Monica, CA (US)

(72) Inventors: Huseyin Coskun, Garfield, NJ (US); Alireza Zareian, Huntington Beach, CA (US); Joshua Moore, New York, NY (US); Chen Wang, Great Neck, NY (US)

(73) Assignee: Snap Inc., Santa Monica, CA (US)

( * ) Notice: Subject to any disclaimer, the term of this patent is extended or adjusted under 35 U.S.C. 154(b) by 433 days.

(21) Appl. No.: 17/939,256

(22) Filed: Sep. 7, 2022

(65) Prior Publication Data
US 2024/0087286 A1    Mar. 14, 2024

(51) Int. Cl.
*G06V 10/762*     (2022.01)
*G06T 5/50*        (2006.01)
*G06V 10/82*      (2022.01)

(52) U.S. Cl.
CPC .............. *G06V 10/762* (2022.01); *G06T 5/50* (2013.01); *G06V 10/82* (2022.01); (Continued)

(58) Field of Classification Search
CPC ..... G06T 2207/10024; G06T 7/20–215; G06T 7/579; G06T 5/50; G06T 2207/20224; G06T 2207/10016; G06F 16/785; G06F 18/2413; G06F 18/211; G06F 16/739; H04N 19/137; H04N 19/51; G06V 20/58; G06V 40/20–28; G06V 10/82;
(Continued)

(56) References Cited

U.S. PATENT DOCUMENTS

| | | | |
|---|---|---|---|
| 11,335,093 B2 * | 5/2022 | Shrivastava | G06F 18/214 |
| 11,368,756 B1 * | 6/2022 | Tran | H04N 7/181 |

(Continued)

OTHER PUBLICATIONS

Toering, Martine, et al. "Self-supervised video representation learning with cross-stream prototypical contrasting." Proceedings of the IEEE/CVF Winter Conference on Applications of Computer Vision. 2022. (Year: 2021).*

(Continued)

*Primary Examiner* — Gregory A Morse
*Assistant Examiner* — Stefano Anthony Dardano
(74) *Attorney, Agent, or Firm* — Schwegman Lundberg & Woessner, P.A.

(57) ABSTRACT

Systems and methods are provided for clustering videos. The system accesses a plurality of content items, the plurality of content items comprising a first set of RGB video frames and a second set of optical flow frames corresponding to the first set of RGB video frames. The system processes the first set of RGB video frames by a first machine learning model to generate a first optimal assignment for the first set of RGB video frames, the first optimal assignment representing initial clustering of the first set of RGB video frames. The system generates an updated first optimal assignment for the first set of RGB video frames based on the first optimal assignment for the first set of RGB video frames and a second optimal assignment of the second (Continued)

set of optical flow frames, the second optimal assignment representing initial clustering of the second set of optical flow frames.

20 Claims, 8 Drawing Sheets

(52) U.S. Cl.
CPC ............... *G06T 2207/10016* (2013.01); *G06T 2207/10024* (2013.01); *G06T 2207/20081* (2013.01); *G06T 2207/20224* (2013.01)

(58) Field of Classification Search
CPC .... G06V 10/762; G06V 20/41; G06V 10/761; G06V 30/19093; G06V 20/40–49; G06V 20/48; G06N 3/02–105
See application file for complete search history.

(56) References Cited

U.S. PATENT DOCUMENTS

| | | | | |
|---|---|---|---|---|
| 2019/0228313 | A1* | 7/2019 | Lee | G06T 7/20 |
| 2020/0084427 | A1* | 3/2020 | Sun | G06N 3/045 |
| 2024/0073478 | A1* | 2/2024 | Black | G06F 16/783 |

OTHER PUBLICATIONS

Coskun, Huseyin, et al. "GOCA: Guided online cluster assignment for self-supervised video representation learning." European Conference on Computer Vision. Cham: Springer Nature Switzerland, 2022. (Year: 2022).*

"Optical Flow." OpenCV, docs.opencv.org/3.4/d4/dee/tutorial_optical_flow.html. Accessed Dec. 6, 2024. (Year: 2022).*

Coates, Adam, and Andrew Y. Ng. "Learning feature representations with k-means." Neural Networks: Tricks of the Trade: Second Edition. Berlin, Heidelberg: Springer Berlin Heidelberg, 2012. 561-580. (Year: 2012).*

Brownlee, Jason. "A Gentle Introduction to Generative Adversarial Network Loss Functions." MachineLearningMastery.Com, Machine Learning Mastery, Sep. 1, 2019, machinelearningmastery.com/generative-adversarial-network-loss-functions/. (Year: 2019).*

Caron, Mathilde, "Unsupervised Learning of Visual Features by Contrasting Cluster Assignments", 34th Conference on Neural Information Processing Systems (NeurIPS 2020), Vancouver, Canada, (2020), 13 pgs.

Han, Tengda, "Self-supervised Co-training for Video Representation Learning", 34th Conference on Neural Information Processing Systems (NeurIPS 2020), Vancouver, Canada, (2020), 12 pgs.

* cited by examiner

CLUSTERING VIDEOS USING A SELF-SUPERVISED DNN

BACKGROUND

As mobile devices continue to be in widespread use, content continuously is uploaded to the Internet and made available to the public. Some content is relevant to users while other content may not be. Users constantly seek better systems for discovering and searching for relevant content. Some aspects used for searching for and finding relevant content rely on the activities depicted in the content, such as in video frames of the content. Certain automated systems exist for analyzing video content and categorizing such content, but the pursuit of understanding human activities in videos is a fundamental problem in computer vision.

BRIEF DESCRIPTION OF THE DRAWINGS

Various ones of the appended drawings merely illustrate examples of the present disclosure and should not be considered as limiting its scope.

DETAILED DESCRIPTION

Figure 1:
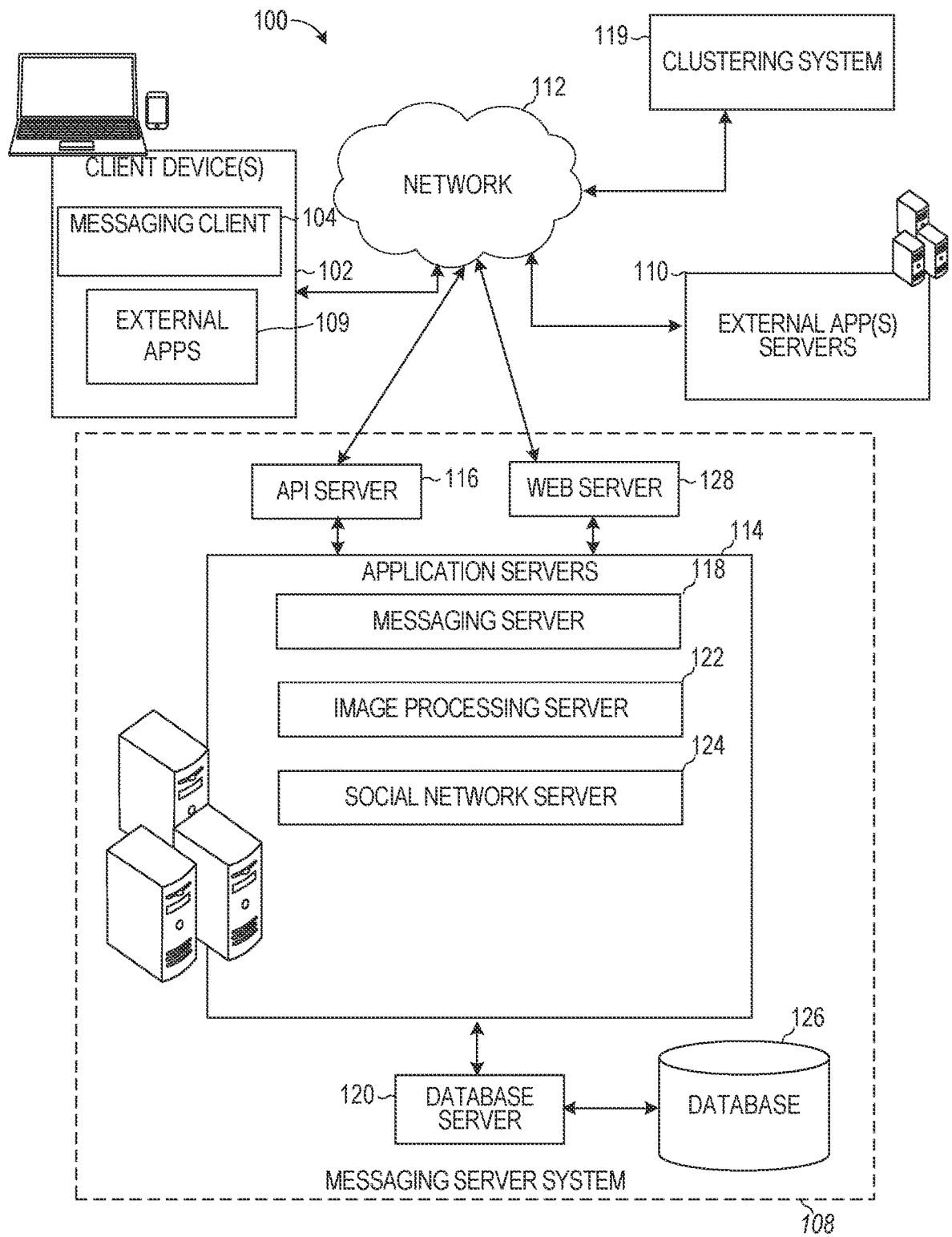
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The pursuit of understanding human activities in videos is a fundamental problem in computer vision. Representation learning methods with supervised training strategies can provide useful results on various tasks, such as understanding actions performed in the videos. However, such methods rely on manually labeled video datasets, which are difficult to generate and obtain on a large scale in an efficient manner. Also, in spite of providing useful results, these algorithms can usually only recognize activities if they have access to a semantically labelled dataset. The cost and challenges of collecting large-scale, manually labelled videos hinder further improvements in understanding various activities performed by humans in videos. The Internet is a virtually unlimited source of unlabeled videos including user generated content (UGC). As such, designing a representation learning strategy that does not rely on manual labelling becomes increasingly important.

Self-supervised learning (SSL) or unsupervised machine learning models aim to address this issue, by designing pretext tasks that only rely on input, and training networks to solve those tasks. Although these methods can provide some useful results to some extent, they rely solely on a red, green, and blue (RGB) video stream, which may not be sufficient to learn a strong temporal representation. Certain other systems rely on an optical flow (OF) representation of the video streams to improve the understanding of human activity depicted in the videos. For example, these systems consider OF as another view of the RGB video stream and minimize the distance between RGB and OF features during online clustering. However, enforcing similarity between RGB and OF features can be detrimental in cases where one information source is noisy, as is usually the case for OF due to camera motion. Furthermore, these methods require a complicated training strategy that successively updates one model while freezing the parameters of the other model, which prevents end-to-end training.

The disclosed examples improve the efficiency and accuracy of classifying human activity in videos using machine learning models by using a clustering system. Particularly, the disclosed techniques provide a guided online cluster assignment algorithm (GOCA). According to the disclosed techniques, for a given video with RGB and OF representations, the GOCA (or clustering system) first computes initial cluster assignments for only using RUB or OF features separately. Then, the clustering system uses these initial assignments as priors for each other to compute a final clustering assignment that is guided by both views. After obtaining the final clustering assignment, a backbone network is trained by minimizing a cross entropy loss between the final cluster assignment of different augmentations of the same video.

In this way, the disclosed techniques construct more robust clusters during training due to prior information, which is particularly important when one information source is noisy. Also, allowing RGB and OF frames of videos to share information by means of sharing cluster assignments enables the two views (e.g., RGB frames and OF frames) to form a similar cluster structure, which leads to more semantically abstract representations. In addition, both the RGB and OF backbones (e.g., neural networks) are trained jointly in an unsupervised manner and information flows both ways during training, which is beneficial for both backbones due to the complementary nature of these views. Finally, compared to the prior methods, OF is utilized more explicitly according to the disclosed techniques, which leads to stronger spatio-temporal representations. The disclosed proposed approach circumvents complicated training strategies allowing end-to-end training.

In some examples, a novel prototype regularization method is used to address a feature collapse problem, where all features are mapped to a single point. According to the disclosed techniques, cluster prototypes are constructed which are maximally distant from each other by locating the N prototypes in the $\Phi$ dimensional space such that they divide the space equally. This further yields improvements in the clustering assignments generated by the clustering system.

Specifically, the disclosed techniques access a plurality of content items, the plurality of content items including a first set of RGB video frames and a second set of optical flow frames corresponding to the first set of RGB video frames. The disclosed techniques process the first set of RGB video frames by a first machine learning model to generate a first optimal assignment for the first set of RGB video frames. The first optimal assignment can represent initial clustering of the first set of RGB video frames. The disclosed techniques generate an updated first optimal assignment for the first set of RGB video frames based on the first optimal assignment for the first set of RGB video frames and a second optimal assignment of the second set of optical flow frames. The second optimal assignment can represent initial clustering of the second set of optical flow frames and can be generated by a second machine learning model.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

In some examples, the messaging system 100 includes a clustering system 119. Any number of clustering systems 119 can be included in the messaging system 100 although only one instance of the clustering system 119 is shown.

The clustering system 119 can access a collection of content items and can classify human activity depicted or described in the collection of content items. Specifically, the clustering system 119 can apply one or more machine learning models to the collection of content items and can generate classifications (e.g., optimal assignments) for each content item in the collection of content items. For example, the clustering system 119 can process a video in the collection of content items and can generate a list of classifications of human activity depicted in the video. In some cases, the clustering system 119 can identify multiple human activities (e.g., multiple classifications) depicted in the same video and can rank the multiple classifications based on weights assigned to each of the classifications by the one or more machine learning models implemented by the clustering system 119.

In some examples, the clustering system 119 accesses a plurality of content items, the plurality of content items including a first set of red, green and blue (RGB) video frames and a second set of optical flow frames corresponding to the first set of RGB video frames. The clustering system 119 processes the first set of RGB video frames by using a first machine learning model to generate a first optimal assignment for the first set of RGB video frames, the first optimal assignment representing initial clustering of the first set of RUB video frames. The clustering system 119 generates an updated first optimal assignment for the first set of RGB video frames based on both the first optimal assignment for the first set of RGB video frames and a second optimal assignment of the second set of optical flow frames. The second optimal assignment can represent initial clustering of the second set of optical flow frames.

In some examples, the clustering system 119 generates the second set of optical flow frames by: obtaining first and second video frames from the first set of RGB video frames; computing a difference frame including motion information based on a deviation between the first and second video frames; and storing the difference frame as one of the second set of optical flow frames. In some examples, the clustering system 119 processes the second set of optical flow frames by using a second machine learning model to generate the second optimal assignment of the second set of optical flow frames.

In some examples, the clustering system 119 generates an updated second optimal assignment for the second set of optical flow frames based on the first optimal assignment for the first set of RGB video frames. Specifically, the clustering system 119 computes a deviation between the updated first optimal assignment and the updated second optimal assignment and updates one or more parameters of at least one of the first or second machine learning models based on the computed deviation.

In some examples, the first and second machine learning models each include a deep neural network (DNN) including one or more encoders. In some examples, the first machine learning model is trained to generate a first set of features corresponding to the first set of RGB video frames. The second machine learning model can be trained to generate a second set of features corresponding to the second set of optical flow frames. In some examples, the first and second machine learning models are trained in an unsupervised manner end-to-end.

In some examples, the initial clustering of the first set of RGB video frames represents different human activity depicted in the first set of RGB video frames. In some examples, the clustering system 119 generates a first set of vectors in response to processing the first set of RGB video frames by the first machine learning model, the first set of vectors representing features of the first set of RGB video frames. The clustering system 119 matches the first set of vectors to prototype cluster centers to generate the first optimal assignment for the first set of RGB video frames. Specifically, the clustering system 119 can apply a Sinkhorn-Knopp technique to match the first set of vectors to the prototype cluster centers. In some cases, the clustering system 119 can apply a Cuturi formulation technique to match the first set of vectors to the prototype cluster centers.

In some examples, the clustering system 119 applies a trained regularization term to equally space the prototype cluster centers. In some examples, the clustering system 119 generates the updated first optimal assignment for the first set of RGB video frames by applying a k-means algorithm to the first optimal assignment for the first set of RGB video frames and the second optimal assignment of the second set of optical flow frames.

In some examples, the clustering system 119 generates a set of augmentations of the first set of RGB video frames. The clustering system 119 processes the set of augmentations by the first machine learning model to generate a third optimal assignment for the set of augmentations and generates an updated third optimal assignment for the set of augmentations based on the third optimal assignment for the set of augmentations and the second optimal assignment of the second set of optical flow frames. In some examples, the clustering system 119 updates one or more parameters of the first machine learning model based on a loss computed as a function of the updated first optimal assignment and the updated third optimal assignment.

A messaging client 104 can communicate and exchange data with other messaging clients 104, the clustering system 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data). The clustering system 119 can be implemented as a stand-alone system, as part of the client device 102 (e.g., part of the messaging client 104), and/or as part of the messaging server system 108.

In some examples, the messaging client 104 can receive one or more videos from a camera of the client device 102. In response to receiving the one or more videos, the messaging client 104 can provide the videos to the clustering system 119. The clustering system 119 can apply the trained one or more machine learning models to the videos and can generate a classification of the human activity depicted in the videos. The classification can be provided back to the messaging client 104 to associate the classification as tags or metadata with the one or more videos. The one or more videos can then be shared with other users and searched for using the associated tags or metadata. In some cases, the tags or metadata that was automatically generated by the clustering system 119 is presented to the user to select or unselect certain classifications to associate or disassociate from the one or more videos.

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding augmented reality experience. Launching the AR experience includes obtaining one or more augmented reality items associated with the AR experience and overlaying the augmented reality items on top of the images or video being presented.

Figure 3:
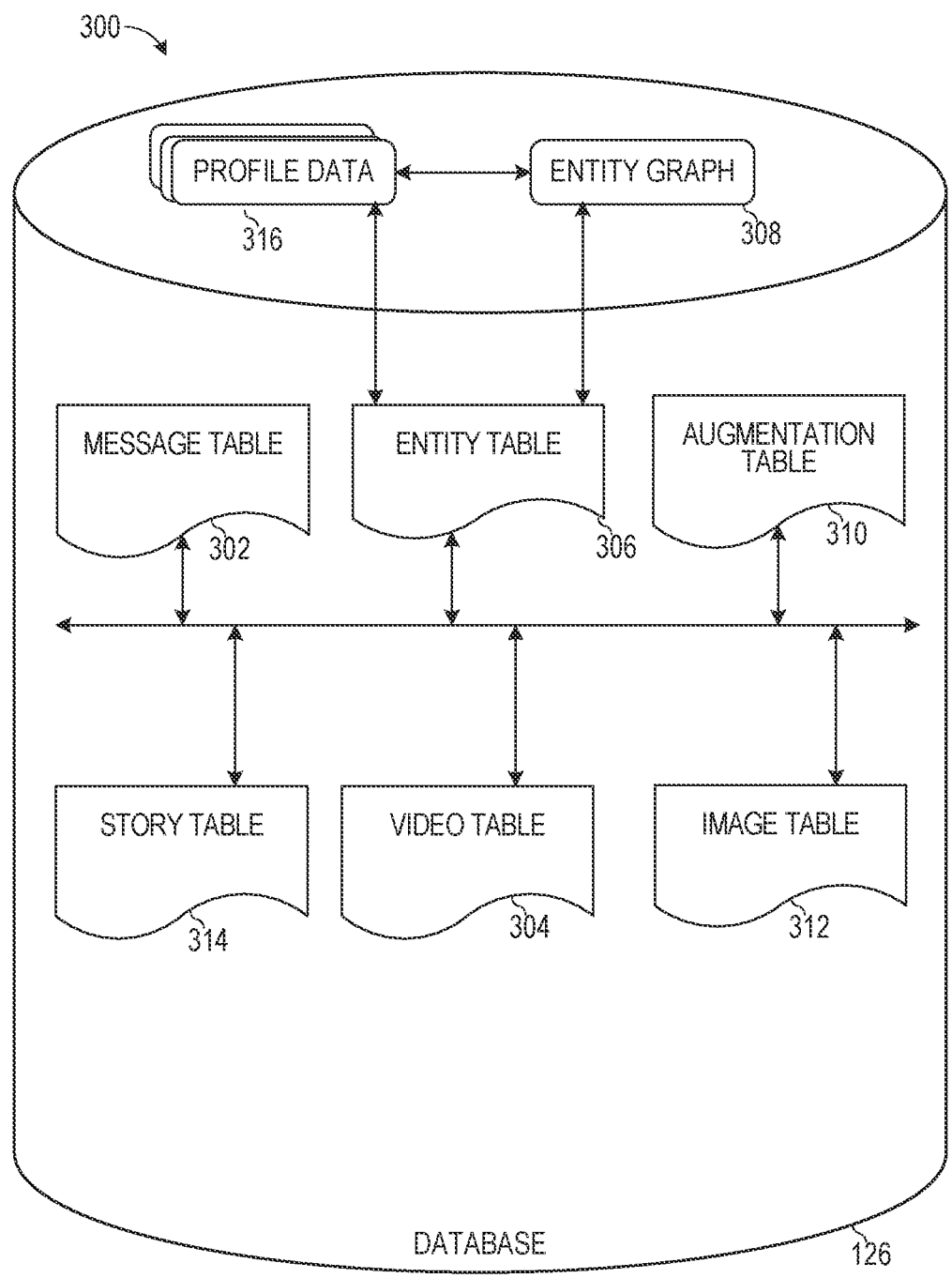
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-tised but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
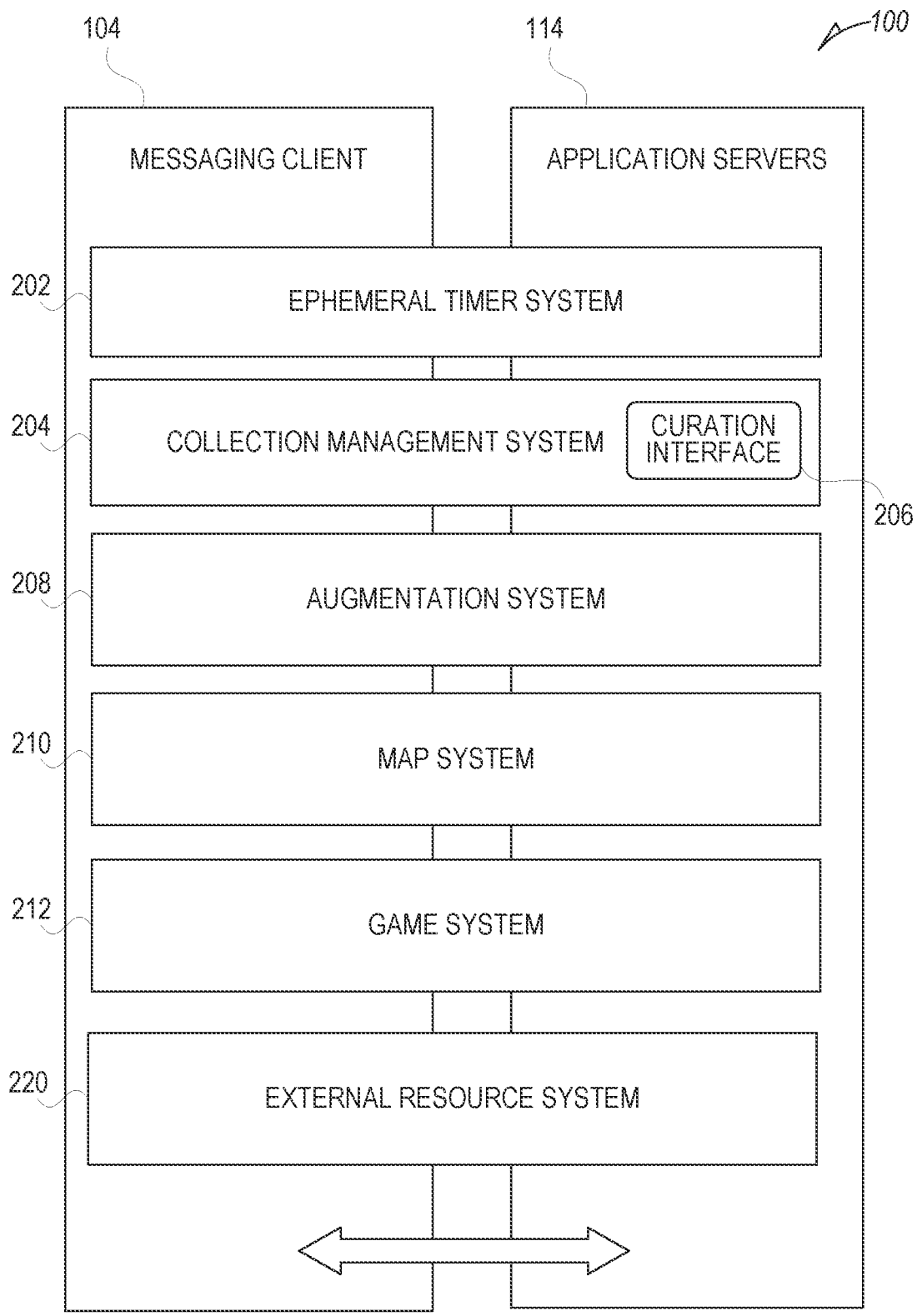
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 18. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee I-louse). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified, For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
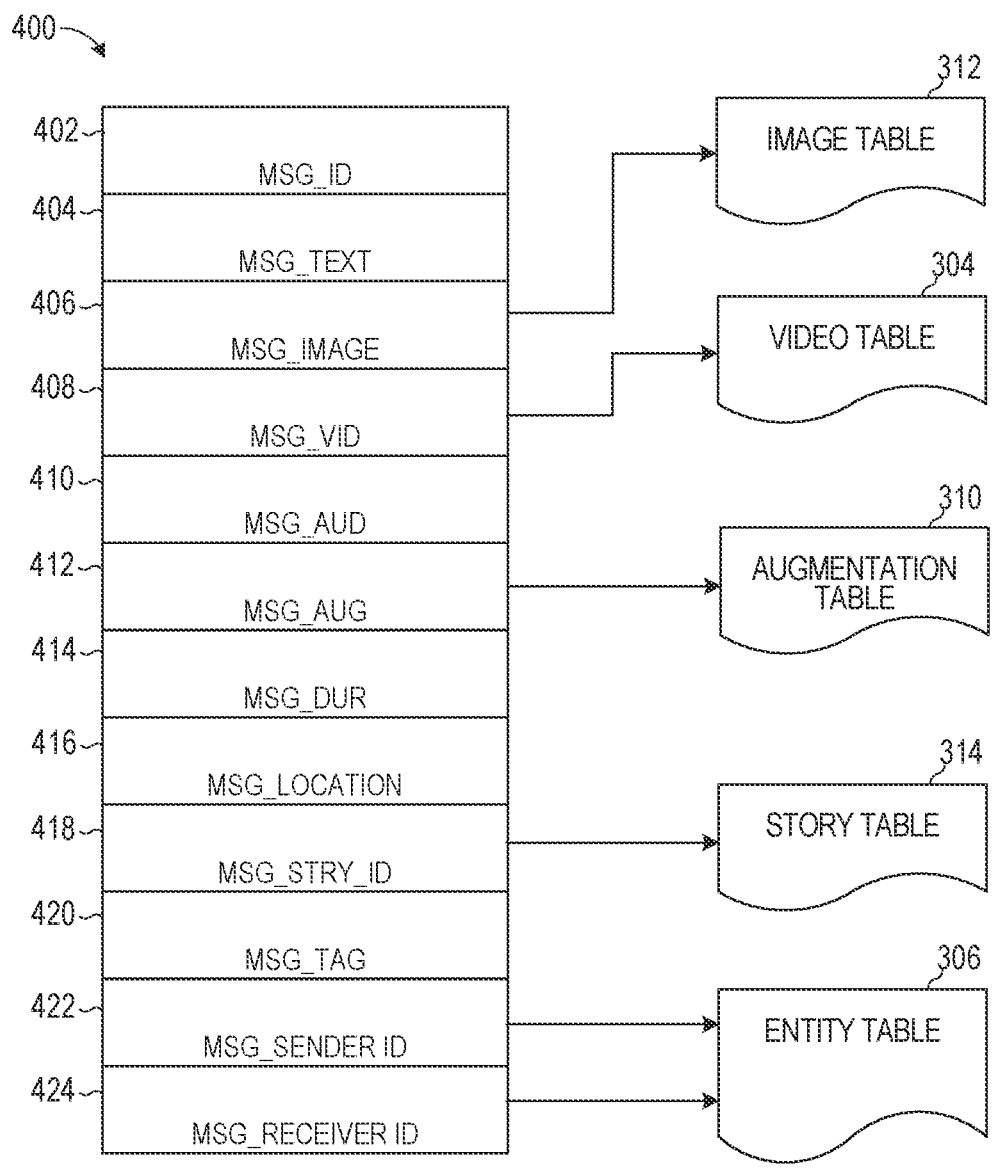
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400;
- message text payload 404: text, to be generated by a user via a user interface of the client device 102, and that is included in the message 400;
- message image payload 406: image data, captured by a camera component of a client device 102 or retrieved from a memory component of a client device 102, and that is included in the message 400. Image data for a sent or received message 400 may be stored in the image table 312;
- message video payload 408: video data, captured by a camera component or retrieved from a memory component of the client device 102, and that is included in the message 400. Video data for a sent or received message 400 may be stored in the video table 304;
- message audio payload 410: audio data, captured by a microphone or retrieved from a memory component of the client device 102, and that is included in the message 400;
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310;
- message duration parameter 414: parameter value indicating, in seconds, the amount of time for which content of the message (e.g., the message image payload 406, message video payload 408, message audio payload 410) is to be presented or made accessible to a user via the messaging client 104;
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408);
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values;
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition;
- message sender identifier 422: an identifier (e.g., a messaging system identifier, email address, or device identifier) indicative of a user of the client device 102 on which the message 400 was generated and from which the message 400 was sent; and
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Clustering System

Figure 5:
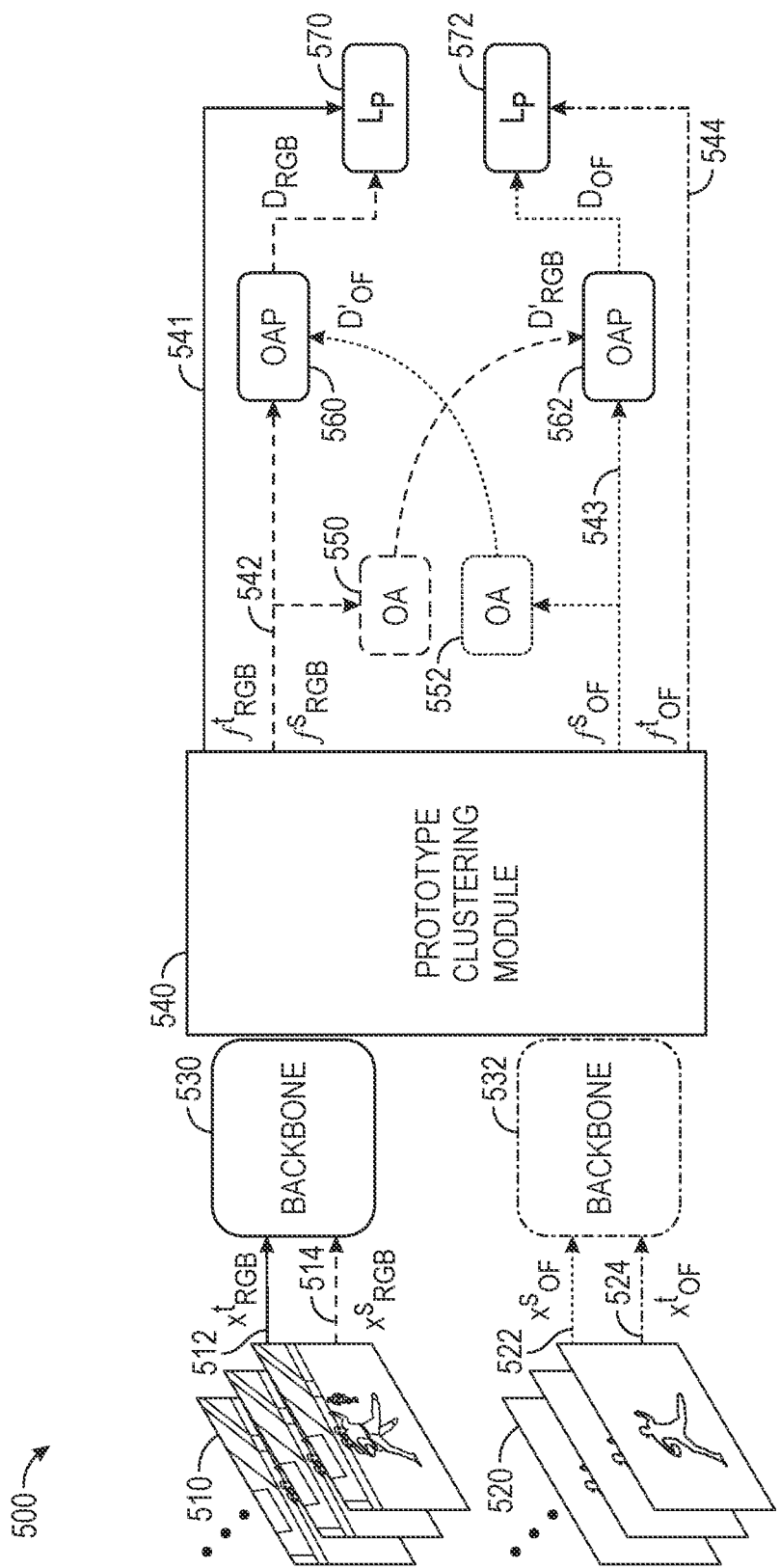
FIG. 5 is an example implementation of a clustering system, according to some examples.

FIG. 5 is an example implementation of the clustering system 500 that implements the clustering system 119, according to some examples. The clustering system 500 includes content items including one or more video frames 510 and/or one or more OF frames 520 corresponding to the one or more video frames 510. The clustering system 500 includes a first backbone network 530, a second backbone network 532, a prototype clustering module 540, and optimal assignment modules 560 and 562.

In some examples, the clustering system 500 retrieves a collection of content items from the Internet and/or from a collection of users. The collection of content items can be random or can be a collection of content items that meet one or more criteria (e.g., a duration parameter, a size parameter, a source parameter, and so forth). The one or more video frames 510 can be used to generate a first set of video frames 512 and a second set of video frames 514. In some implementations, the first and second sets of video frames 512 and 514 can be RGB video frames. The second set of video frames 514 can be an augmented version of the first set of video frames 512. The second set of video frames 514 can be generated by applying various transformations or augmentations to the first set of video frames 512, such as modifying an orientation, cropping, brightness, rotation, and so forth. The first and second sets of video frames 512 and 514 are provided to the first backbone network 530. The first backbone network 530 can implement a first machine learning model (e.g., one or more encoders) that is trained to generate a first set of features from video frames the first backbone network 530 receives.

In some implementations, the clustering system 500 processes the one or more video frames 510 to generate one or more OF frames 520. Specifically, the clustering system 500 can select a first sequence of video frames from the one or more video frames 510. The clustering system 500 can compute a deviation or difference frame representing motion based on a deviation between a first frame and a second adjacent or non-adjacent frame of the first sequence of video frames. The clustering system 500 can continue processing the first sequence of video frames in this manner until a collection of difference frames is generated and used as the one or more OF frames 520. In some examples, the clustering system 500 generates a respective collection of OF frames 520 for each video included in the one or more video frames 510.

In some examples, the one or more OF frames 520 are used to generate a first set of OF frames 522 and a second set of OF frames 524. The second set of OF frames 524 can be an augmented version of the first set of OF frames 522. In some examples, the second set of video frames 514 can be generated by applying various transformations or augmentations to the first set of video frames 512, such as modifying an orientation, cropping, brightness, rotation, and so forth. In some examples, the second set of video frames 514 are generated by processing the second set of video frames 514 and computing difference frames from the second set of video frames 514. Namely, the clustering system 500 can generate the first set of OF frames 522 directly from difference frames generated using the first set of video frames 512 and can separately generate the second set of OF frames 524 directly from difference frames generated using the second set of video frames 514. The first and second sets of OF frames 522 and 524 are provided to the second backbone network 532. The second backbone network 532 can implement a second machine learning model (e.g., one or more encoders) that is trained to generate a second set of features from OF frames the second backbone network 532 receives.

The first and second backbone networks 530 and 532 can be implemented as separate modules and trained in an unsupervised approach separately or together in an end-to-end manner. In some cases, the first and second backbone networks 530 and 532 can be implemented by a single machine learning model that is trained in an unsupervised approach to process RGB video frames and OF frames together.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), deep NN (DNN), matrix factorization, and Support Vector Machines (SVM) tools may be used for classifying or scoring videos.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example. The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages detecting urgency in the message, detecting a relationship of the user to the sender, calculating score attributes, calculating message scores, etc.

With the training data and the identified features, the machine-learning tool is trained by a machine-learning program training. The machine-learning tool appraises the value of the features as they correlate to the training data. The result of the training is the trained machine-learning program. When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised, or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing video frames to generate outcomes or predictions or classifications of the human activity depicted in the video frames, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as an individual measurable property of a process, article, system, or phenomenon represented by a data set (e.g., the training data).

In training phases, the machine-learning program uses the training data to find correlations among the features that affect a predicted outcome or assessment. With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a DNN that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron. In some cases, these neurons implement one or more encoder or decoder networks.

In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RN), merely for example.

During prediction phases, the trained machine-learning program is used to perform an assessment. Video data is provided as an input to the trained machine-learning program, and the trained machine-learning program, generates the assessment as output, responsive to receipt of the video data.

The first backbone network 530 can provide the first set of features extracted from or generated from the first and/or second sets of video frames 512 and 514 to the prototype clustering module 540. The prototype clustering module 540 can apply a Sinkhiorn-Knopp technique or algorithm to the features received from the first backbone network 530 to generate a first initial optimal assignment (OA) 550 that represents an initial classification of the features of the first and second sets of video frames 512 and 514. In some cases, the clustering system 119 can apply a Cuturi formulation technique to perform the clustering.

The second backbone network 532 can provide the second set of features extracted from or generated from the first and/or second sets of OF frames 522 and 524 to the prototype clustering module 540. The prototype clustering module 540 can apply a Sinkhorn-Knopp technique or algorithm (or Cuturi formulation) to the features received from the second backbone network 532 to generate a second initial optimal assignment (OA) 552 that represents an initial classification of the features of the first and second sets of OF frames 522 and 524.

The second initial OA 552 can be provided to the optimal assignment modules 560. The optimal assignment modules 560 is configured to process the first initial OA 550 generated by processing the first set of features extracted from or generated from the first and/or second sets of video frames 512 and 514 together with the second initial OA 552 generated by processing the second set of features extracted from or generated from the first and/or second sets of OF frames 522 and 524. The optimal assignment modules 560 generates an updated first initial OA (e.g., $D_{RGB}$) by performing a k-means algorithm or technique on the different classifications received from the first initial OA 550 and the second initial GA 552.

Similarly, first initial OA 550 can be provided to the optimal assignment modules 562. The optimal assignment modules 562 is configured to process the second initial OA 552 generated by processing the second set of features extracted from or generated from the first and/or second sets of OF frames 522 and 524 together with the first initial OA 550 generated by processing the second set of features extracted from or generated from the first and/or second sets of video frames 512 and 514. The optimal assignment modules 562 generates an updated second initial OA (e.g., $D_{OF}$) by performing a k-means algorithm or technique on the different classifications received from the first initial OA 550 and the second initial OA 552. The updated first initial OA and the updated second initial OA can be used to determine a final classification of the content items received by the clustering system 500 (e.g., the one or more video frames 510).

In some examples, the clustering system 500 can compute a first loss 570 based on a deviation between the OA generated based on the first set of features extracted from or generated from the first and/or second sets of video frames 512 and 514 (e.g., only the second set of video frames 514 or only the first set of video frames 512) and the updated first initial OA generated based on applying or using the second initial OA 552. This first loss 570 can be used to update one or more parameters of the first backbone network 530 and/or the second backbone network 532. Similarly, the clustering system 500 can compute a second loss 572 based on a deviation between the OA generated based on the second set of features extracted from or generated from the first and/or second sets of OF frames 522 and 524 (e.g., only the second set of OF frames 524 or only the first set of OF frames 522) and the updated second initial OA generated based on applying or using the first initial OA 550. This second loss 572 can be used to update one or more parameters of the first backbone network 530 and/or the second backbone network 532.

In some examples, an additional loss term can be computed based on a deviation between the updated first initial OA (e.g., $D_{RGB}$) and the updated second initial OA (e.g., $D_{OF}$). This additional loss term can be used to update one or more parameters of the first backbone network 530 and/or the second backbone network 532 together with or separately from the first and/or second losses 570 and 572.

In some examples, the clustering system 500 receives minibatch of A videos $X=\{x_1, \ldots, x_M\}$ as the one or more video frames 510, and N prototypes P $\{p_1, \ldots, p_N\}$ represented by trainable vectors as the prototype clustering module 540. The clustering system 500 computes two random augmentations $X^t$ and $X^s$ (e.g., video frames 512 and video frames 514) and computes their feature vectors $F^t = \{f_1^t, \ldots, f_i^t\}$ and $F^s = \{f_1^s, \ldots, f_i^s\}$ using an encoder network $\theta$ (e.g., the first backbone network 530). Next optimal assignments $D^t = \{d_1^t, \ldots, d_M^t\}$ and $D^s = \{d_1^s, \ldots, d_M^s\}$ are computed by the prototype clustering module 540 from features $F^t$ and $F^s$ to prototypes P. $d_i^t \in D^t$ and $d_i^s \in D^s$ vectors represent assignment values from $f_i^s$ and $f_i^t$ to prototypes, respectively. Finally, $\theta$ (e.g., first backbone network 530) is trained with the following loss function:

$$L(F^t, F^s) = \sum_i^M (l(d_i^t, g_i^s) + l(d_i^s, g_i^t)), \quad (1)$$

where $$l(d^t, g^s) = -\sum_n^N d_n^t \log(g_n^s), \ g_n^s = \frac{\exp((f^s)^\top p_n)}{\sum_{n'} \exp((f^s)^\top p_{n'})} \quad (2)$$

This loss function minimizes the distance of two different augmentations by comparing them according to their assignment. Ideally, the two augmentations should be assigned to the same prototype, due to identical semantic content.

In some examples, the optimal assignment (OA) D can be found by solving the following optimization $$d_C(F, P) := \min_{D \in U}(D, C), \quad (3)$$

where $C \in R^{M \times N}$ is a distance matrix from a batch of feature vectors to prototypes and $\langle D, C \rangle = \mathrm{tr}(C^\top D)$. U represents all possible assignments from the features F to prototypes P.

$$U := \{D \in R_+^{M \times N} \mid D 1_N = \psi, D^\top 1_M = \omega\}, \quad (4)$$

where $$\psi = \frac{1}{M} * \vec{1}_M \text{ and } \omega = \frac{1}{N} * \vec{1}_N, \text{ and } \vec{1}_M \in R^M \text{ and } \vec{1}_N \in R^N$$

are ones vectors. The constraint on U ensures all the prototypes are selected. Eq. (3) can be solved with linear programming. In some cases, the Cuturi technique adds entropy regularization and solves the resulting problem with the Sinkhorn algorithm:

$$d_c(F,P) := \min_{D \in U}(\langle D, C \rangle - \lambda_1 h(D)) \quad (5)$$

where h represents the entropy. This allows the clustering system 500 to efficiently approximate D. Specifically, D has a unique solution for any given $\lambda_1$ which is in the form of: $D^{\lambda,1} = \mathrm{diag}(u) K \, \mathrm{diag}(v)$ where $K = e^{\lambda_1 C}$, and u, v are nonnegative unique vectors. If K has only positive elements, the unknowns u and v can be determined via the Sinkhorn algorithm.

In some examples, the clustering system 500 assigns $D'_{OF}$ and $D'_{RGB}$ as the initial prototype assignment (computed based on Eq. (5)), and $D_{OF}$ and $D_{RGB}$ as the final prototype assignment or clustering. To this end, the clustering system 500 may use the $D'_{OF}$ as the prior to $D_{RGB}$, and $D'_{RGB}$ as the prior to $D_{OF}$. In some cases, clustering system 500 modifies Eq. (5) in a way that it takes the prior into account. The optimal assignment with prior (OAP) optimization problems for $D_{RGB}$ and $D_{OF}$ takes this form:

$$d_{C_{RGB}}(F_{RGB}, P) := \quad (6)$$
$$\min_{D_{RGB} \in U} (\langle D_{RGB}, C_{RGB} \rangle - \lambda_1 h(D_{RGB}) + \lambda_2 KL(D_{RGB} \mid D'_{OF})),$$

and $$d_{C_{OF}}(F_{OF}, P) := \min_{D_{OF} \in U} (\langle D_{OF}, C_{OF} \rangle - \lambda_1 h(D_{OF}) + \lambda_2 KL(D_{OF} \mid D'_{RGB})). \quad (7)$$

where $C_{RGB}$ and $C_{OF}$ are distance matrices from RGB and OF features to prototypes, $KL(\cdot \mid \cdot)$ represents a Kullback Leibler divergence between two assignment matrices, $\zeta_1$ and $\lambda_2$ are hyper-parameters.

These two optimization problems defined by equations (6) and (7) can be solved via the following lemma:

$D_{RGB}$ and $D_{OF}$ have a unique solution for $\lambda_1$ and $\lambda_2$ in the form of:

$$D_b^{\lambda_1, \lambda_2} = 2 \, \mathrm{diag}(u_b) K_b \, \mathrm{diag}(v_b) b \in \{RGB, OF\} \quad (8)$$

according to the Sinkhorn technique, $D_{RGB}^{\lambda_1, \lambda_2}$ has unique solution for any given $\lambda_1$ and $\lambda_2$. Thus, $u_{RGB}$ and $v_{RGB}$ vectors in Eq. (8) can be computed with Sinkhorn algorithm. Since the final cluster assignment relies on both views, formed clusters will be robust to noise and semantically abstract.

In some implementations, self-supervised learning models can suffer from feature collapse, such as when all features are mapped to the same representation. To address this issue, the clustering system 500 uses a regularization term that encourages prototypes to be maximally far apart. The clustering system 500 divides the $\Phi$-dimensional hyperspherical space equally into N prototypes. For instance, for a 2-dimensional hyperspherical space (circle), this can be easily done by placing N prototypes with a $2\pi/N$ angle difference. Even though this is easy to do for a 2-dimensional space, there is no exact solution for 3 or more dimensions. The clustering system 500 solves this problem by finding an approximate solution using gradient descent.

Specifically, consider the N prototypes that are represented with a linear layer, $W \in R^{N \times \Phi}$. Instead of training W with the rest of the network end-to-end, the clustering system 500 trains it separately, once before the main training phase of the first backbone network 530 and the second backbone network 532, by minimizing the following loss under the following constraint:

$$\mathcal{L}_{reg} = \frac{1}{N} \sum_i^N \max(\Omega_{i_r}), \ \Omega = WW^\top - 2I \text{ s.t. } \forall_i \|w_i\| = 1,$$

where I and $w_1$ represents the identity matrix and i-th row in W, respectively. This loss minimizes the similarity of maximally similar prototypes. To apply the constraint, the clustering system 500 continuously re-projects the prototypes to the hypersphere during training via l2 normalization.

In some examples, after initializing (and fixing) the prototype layer as described in Eq. (11), the clustering system 500 trains the network by minimizing the following loss function:

$$\mathcal{L}_{final} = \mathcal{L}_p(F^t_{RGB}, F^s_{RGB}) + \mathcal{L}_p(F^t_{OF}, F^s_{OF}), \quad (12)$$

where $$\mathcal{L}_p(F^t_b, F^s_b) = \sum_i^M l(d^t_{b_i}, g^s_{b_i}) + l(d^s_{b_i}, g^t_{b_i}) \quad (13)$$

Here $b \in \{RGB, OF\}$ and $d_{b_i}$, i-th row in $D_b$. $D_b$ represents optimal assignment matrix. The clustering system 500 computes these matrices using Lemma I. Note that l and g can be defined in Eq. (2). Since RGB and OF features only interact when computing optimal assignment, this formulation encourages cluster similarity without enforcing RGB and OF features to be strictly similar, hence, not leading to information loss.

Figure 6:
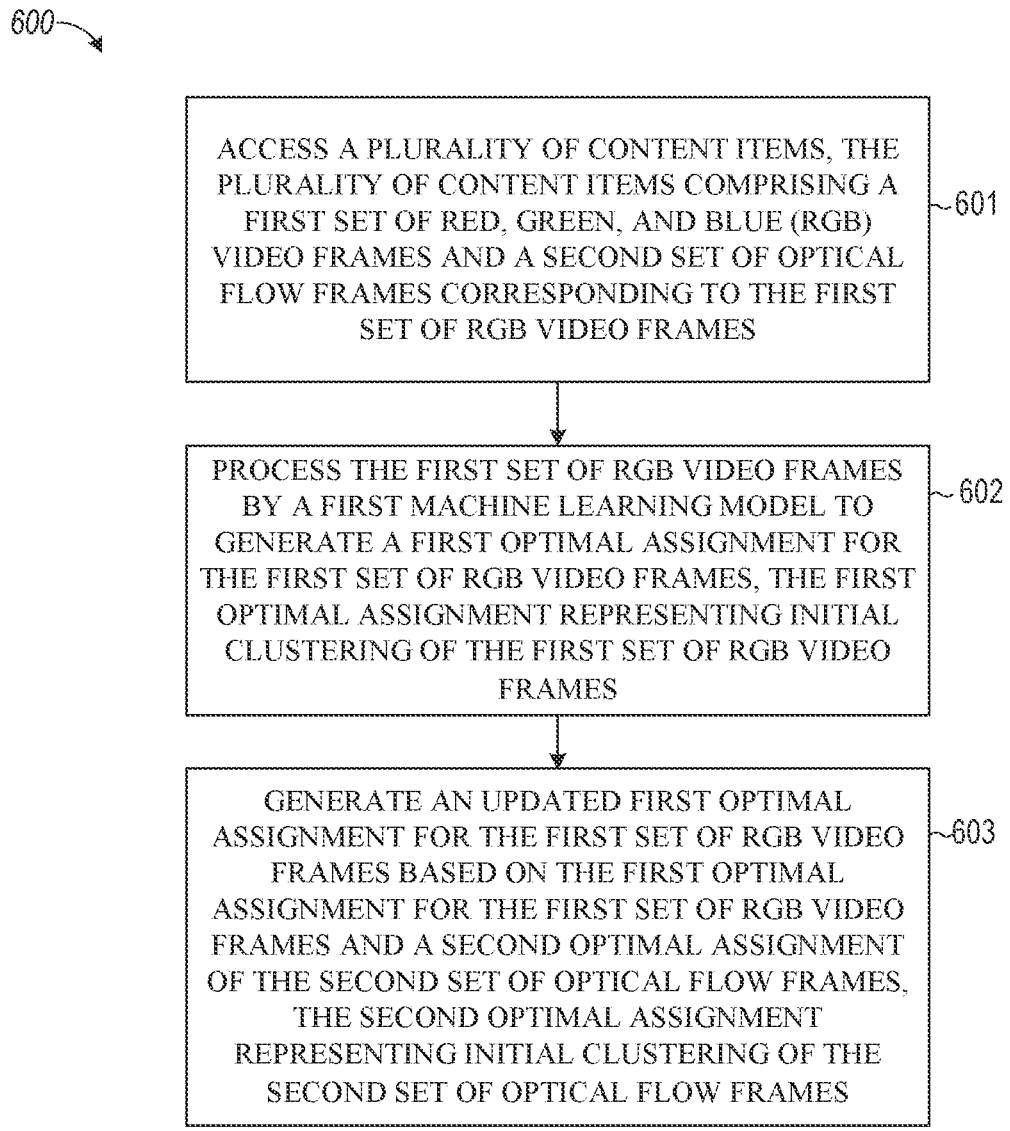
FIG. 6 is an example flow diagram of operations performed by the clustering system, according to some examples.

FIG. 6 is a flowchart illustrating example operations of the clustering system 119 in performing a process 600, according to some examples. The process 600 may be embodied in computer-readable instructions for execution by one or more processors such that the operations of the process 600 may be performed in part or in whole by the functional components of the clustering system 119; accordingly, the process 600 is described below by way of example with reference thereto. However, in other examples, at least some of the operations of the process 600 may be deployed on various other hardware configurations. The process 600 is therefore not intended to be limited to the clustering system 119 and can be implemented in whole, or in part, by any other component. Some or all of the operations of process 600 can be in parallel, out of order, or entirely omitted.

At operation 601, the clustering system 119 accesses a plurality of content items, the plurality of content items comprising a first set of red, green, and blue (RGB) video frames and a second set of optical flow frames corresponding to the first set of RGB video frames, as discussed above and below.

At operation 602, the clustering system 119 processes the first set of RGB video frames by a first machine learning model to generate a first optimal assignment for the first set of RGB video frames, the first optimal assignment representing initial clustering of the first set of RGB video frames, as discussed above and below.

At operation 603, the clustering system 119 generates an updated first optimal assignment for the first set of RGB video frames based on both the first optimal assignment for the first set of RGB video frames and a second optimal assignment of the second set of optical flow frames, the second optimal assignment representing initial clustering of the second set of optical flow frames, as discussed above and below.

Machine Architecture

Figure 7:
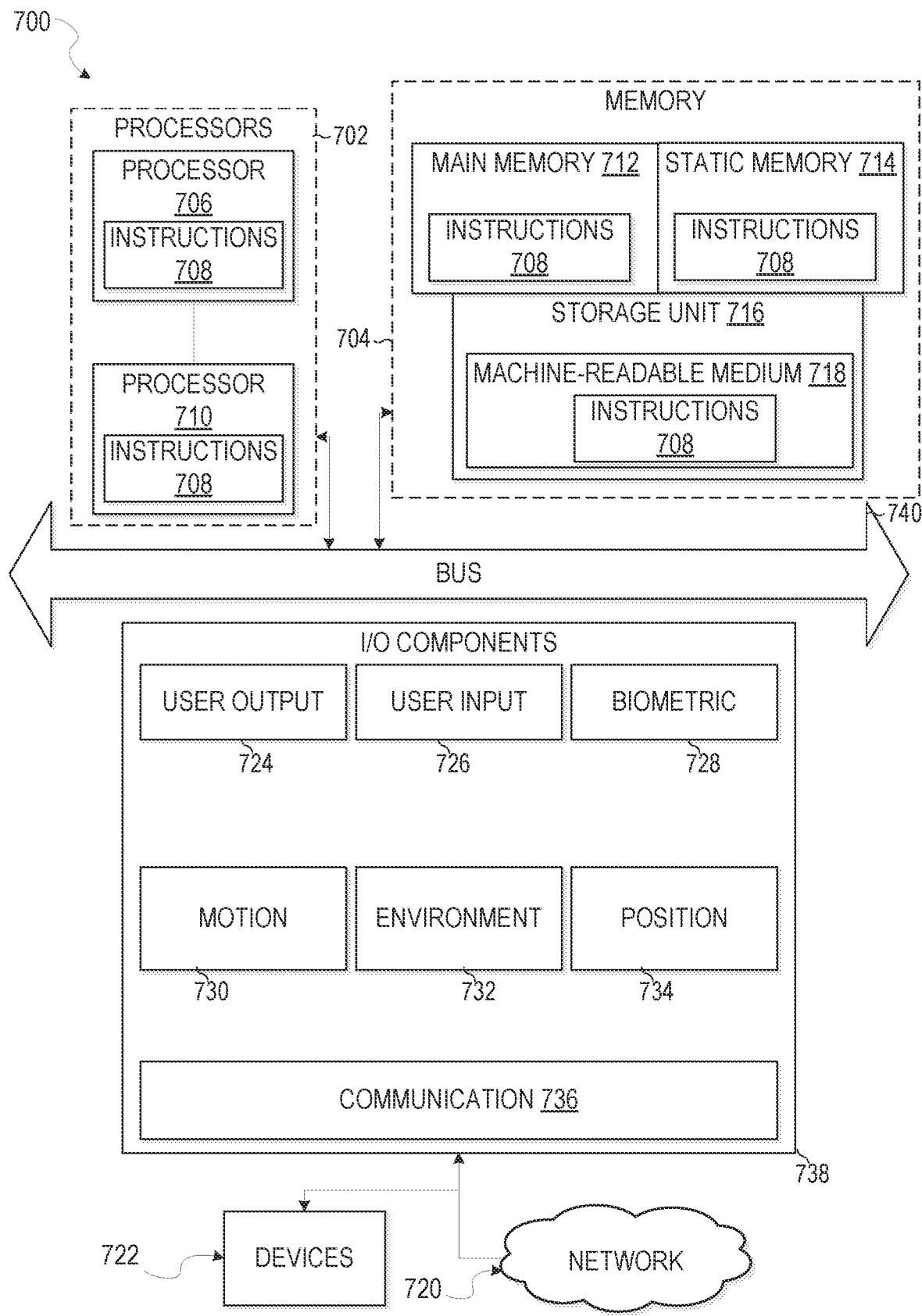
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 702, memory 704, and input/output (I/O) components 738, which may be configured to communicate with each other via a bus 740. In an example, the processors 702 (e.g., a Central Processing Unit (CPLT), a Reduced Instruction Set Computing (RISC) Processor, a Complex Instruction Set Computing (CISC) Processor, a Graphics Processing UTnit (GPU), a Digital Signal Processor (DSP), an Application Specific Integrated Circuit (ASIC), a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single-core, a single processor with multiple cores (e.g., a multi-core processor), multiple processors with a single core, multiple processors with multiples cores, or any combination thereof.

The memory 704 includes a main memory 712, a static memory 714, and a storage unit 716, all accessible to the processors 702 via the bus 740. The main memory 704, the static memory 714, and the storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 738 may include a wide variety of components to receive input, provide output, produce output, transmit information, exchange information, capture measurements, and so on. The specific I/O components 738 that are included in a particular machine will depend on the type of machine. For example, portable machines such as mobile phones may include a touch input device or other such input mechanisms, while a headless server machine will likely not include such a touch input device. It will be appreciated that the I/O components 738 may include many other components that are not shown in FIG. 7. In various examples, the I/O components 738 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 738 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 738 further include communication components 736 operable to couple the machine 700 to a network 720 or devices 722 via respective coupling or connections. For example, the communication components 736 may include a network interface Component or another suitable device to interface with the network 720. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 712, static memory 714, and memory of the processors 702) and storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed examples.

The instructions 708 may be transmitted or received over the network 720, using a transmission medium, via a network interface device (e.g., a network interface component included in the communication components 736) and using any one of several well-known transfer protocols (e.g., hypertext transfer protocol (HTTP)). Similarly, the instructions 708 may be transmitted or received using a transmission medium via a coupling (e.g., a peer-to-peer coupling) to the devices 722.

Software Architecture

Figure 8:
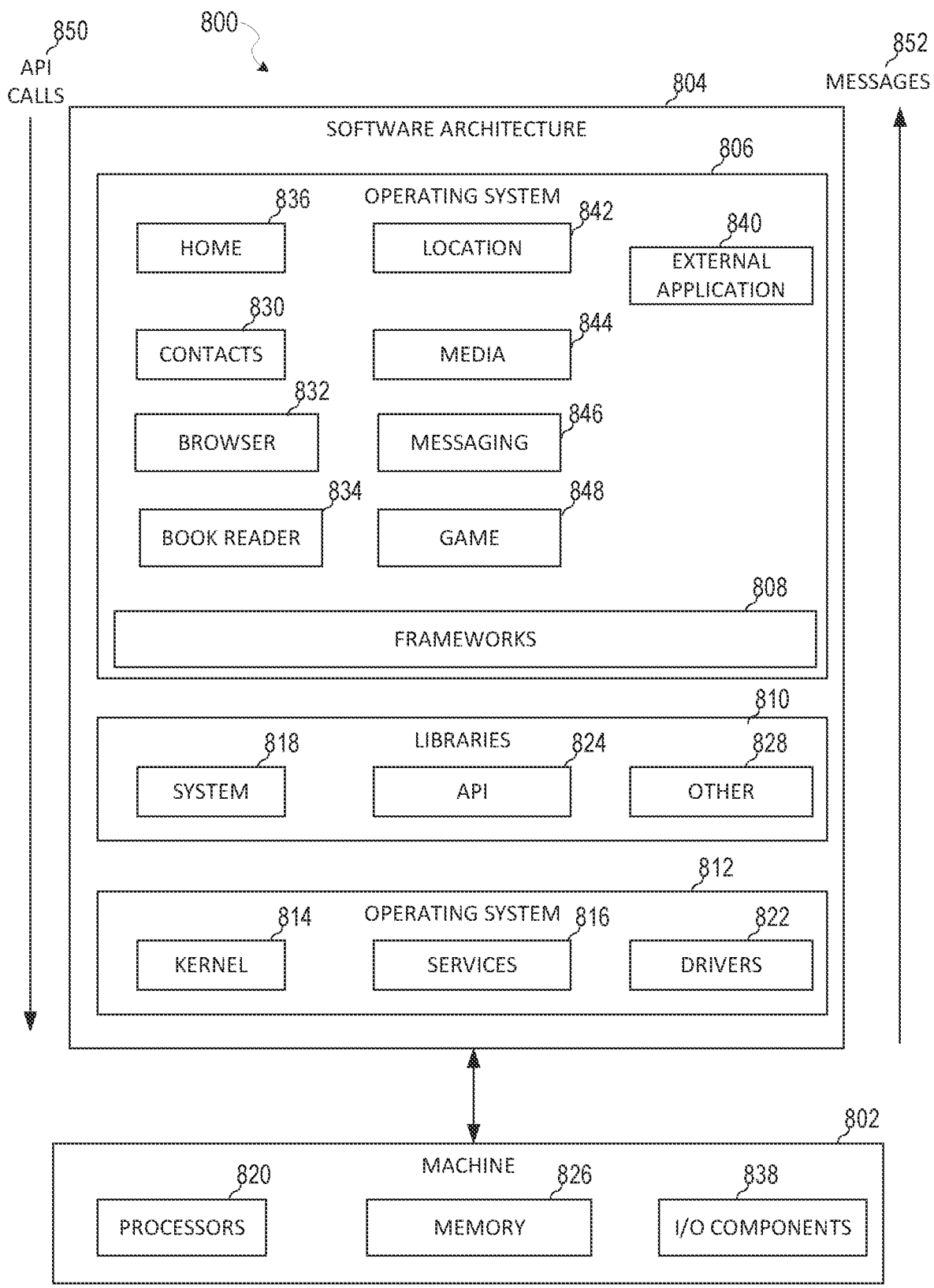
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH®, Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g. libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (Gi( ) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as an external application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the external application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 840 can invoke the API calls 850 provided by the operating system 812 to facilitate functionality described herein.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, mnulti-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (IxRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPLI MERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a. Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

Modules, Components, and Logic

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some examples, the processors or processor-implemented modules are located in a single geographic location (e.g., within a home environment, an office environment, or a server farm). In other examples, the processors or processor-implemented modules are distributed across a number of geographic locations.

What is claimed is:

1. A method comprising:
   accessing a plurality of content items, the plurality of content items comprising a first set of red, green, and blue (RGB) video frames and a second set of optical flow frames corresponding to the first set of RGB video frames;
   processing the first set of RGB video frames by a first machine learning model to generate a first optimal assignment for the first set of RGB video frames, the first optimal assignment representing initial clustering of the first set of RGB video frames;
   generating an updated first optimal assignment for the first set of RGB video frames based on both the first optimal assignment for the first set of RGB video frames and a second optimal assignment of the second set of optical flow frames, the second optimal assignment representing initial clustering of the second set of optical flow frames;
   generating a set of augmentations of the first set of RGB video frames;
   processing the set of augmentations by the first machine learning model to generate a third optimal assignment for the set of augmentations;
   generating an updated third optimal assignment for the set of augmentations based on the third optimal assignment for the set of augmentations and the second optimal assignment of the second set of optical flow frames; and
   updating one or more parameters of the first machine learning model based on a loss computed as a function of the updated first optimal assignment and the updated third optimal assignment.

2. The method of claim 1, further comprising generating the second set of optical flow frames by:
   obtaining first and second video frames from the first set of RGB video frames;
   computing a difference frame comprising motion information based on a deviation between the first and second video frames; and
   storing the difference frame as one of the second set of optical flow frames.

3. The method of claim 1, further comprising:
   processing the second set of optical flow frames by a second machine learning model to generate the second optimal assignment of the second set of optical flow frames.

4. The method of claim 3, further comprising:
   generating an updated second optimal assignment for the second set of optical flow frames based on the first optimal assignment for the first set of RGB video frames.

5. The method of claim 4, further comprising:
   computing a deviation between the updated first optimal assignment and the updated second optimal assignment; and
   updating one or more parameters of at least one of the first or second machine learning models based on the computed deviation.

6. The method of claim 3, wherein the first and second machine learning models each comprise a deep neural network (DNN) comprising one or more encoders.

7. The method of claim 3, wherein the first machine learning model is trained to generate a first set of features corresponding to the first set of RGB video frames, and wherein the second machine learning model is trained to generate a second set of features corresponding to the second set of optical flow frames.

8. The method of claim 7, wherein the first and second machine learning models are trained in an unsupervised manner end-to-end.

9. The method of claim 1, wherein the initial clustering of the first set of RGB video frames represents different human activity depicted in the first set of RGB video frames.

10. The method of claim 1, further comprising:
    generating a first set of vectors in response to processing the first set of RGB video frames by the first machine learning model, the first set of vectors representing features of the first set of RGB video frames; and
    matching the first set of vectors to prototype cluster centers to generate the first optimal assignment for the first set of RGB video frames.

11. The method of claim 10, further comprising applying a Sinkhorn-Knopp technique to match the first set of vectors to the prototype cluster centers.

12. The method of claim 10, further comprising applying a trained regularization term to equally space the prototype cluster centers.

13. The method of claim 1, wherein generating the updated first optimal assignment for the first set of RGB video frames comprises applying a k-means algorithm to the first optimal assignment for the first set of RGB video frames and the second optimal assignment of the second set of optical flow frames.

14. A system comprising:
    at least one processor programmed to perform operations comprising:
    accessing a plurality of content items, the plurality of content items comprising a first set of red, green, and blue (RGB) video frames and a second set of optical flow frames corresponding to the first set of RGB video frames;
    processing the first set of RGB video frames by a first machine learning model to generate a first optimal assignment for the first set of RGB video frames, the first optimal assignment representing initial clustering of the first set of RGB video frames;
    generating an updated first optimal assignment for the first set of RGB video frames based on both the first optimal assignment for the first set of RGB video frames and a second optimal assignment of the second set of optical flow frames, the second optimal assignment representing initial clustering of the second set of optical flow frames;
    generating a set of augmentations of the first set of RGB video frames;
    processing the set of augmentations by the first machine learning model to generate a third optimal assignment for the set of augmentations;
    generating an updated third optimal assignment for the set of augmentations based on the third optimal assignment for the set of augmentations and the second optimal assignment of the second set of optical flow frames; and
    updating one or more parameters of the first machine learning model based on a loss computed as a function of the updated first optimal assignment and the updated third optimal assignment.

15. The system of claim 14, the operations further comprising generating the second set of optical flow frames by:
    obtaining first and second video frames from the first set of RGB video frames;

computing a difference frame based on a deviation between the first and second video frames comprising motion information; and storing the difference frame as one of the second set of optical flow frames.

16. The system of claim 14, the operations further comprising:

processing the second set of optical flow frames by a second machine learning model to generate the second optimal assignment of the second set of optical flow frames.

17. The system of claim 16, the operations further comprising:

generating an updated second optimal assignment for the second set of optical flow frames based on the first optimal assignment for the first set of RGB video frames.

18. A non-transitory machine-readable storage medium comprising instructions that, when executed by one or more processors of a machine, cause the machine to perform operations comprising:

accessing a plurality of content items, the plurality of content items comprising a first set of red, green, and blue (RGB) video frames and a second set of optical flow frames corresponding to the first set of RGB video frames;

processing the first set of RGB video frames by a first machine learning model to generate a first optimal assignment for the first set of RGB video frames, the first optimal assignment representing initial clustering of the first set of RGB video frames;

generating an updated first optimal assignment for the first set of RGB video frames based on both the first optimal assignment for the first set of RGB video frames and a second optimal assignment of the second set of optical flow frames, the second optimal assignment representing initial clustering of the second set of optical flow frames;

generating a set of augmentations of the first set of RGB video frames;

processing the set of augmentations by the first machine learning model to generate a third optimal assignment for the set of augmentations;

generating an updated third optimal assignment for the set of augmentations based on the third optimal assignment for the set of augmentations and the second optimal assignment of the second set of optical flow frames; and updating one or more parameters of the first machine learning model based on a loss computed as a function of the updated first optimal assignment and the updated third optimal assignment.

19. The non-transitory machine-readable storage medium of claim 18, the operations comprising generating the second set of optical flow frames by:

obtaining first and second video frames from the first set of RGB video frames;

computing a difference frame comprising motion information based on a deviation between the first and second video frames; and storing the difference frame as one of the second set of optical flow frames.

20. The non-transitory machine-readable storage medium of claim 18, the operations comprising:

processing the second set of optical flow frames by a second machine learning model to generate the second optimal assignment of the second set of optical flow frames.

\* \* \* \* \*